March 17, 1925. 1,530,141
E. A. SHALLCROSS
HANGER
Filed Dec. 26, 1923
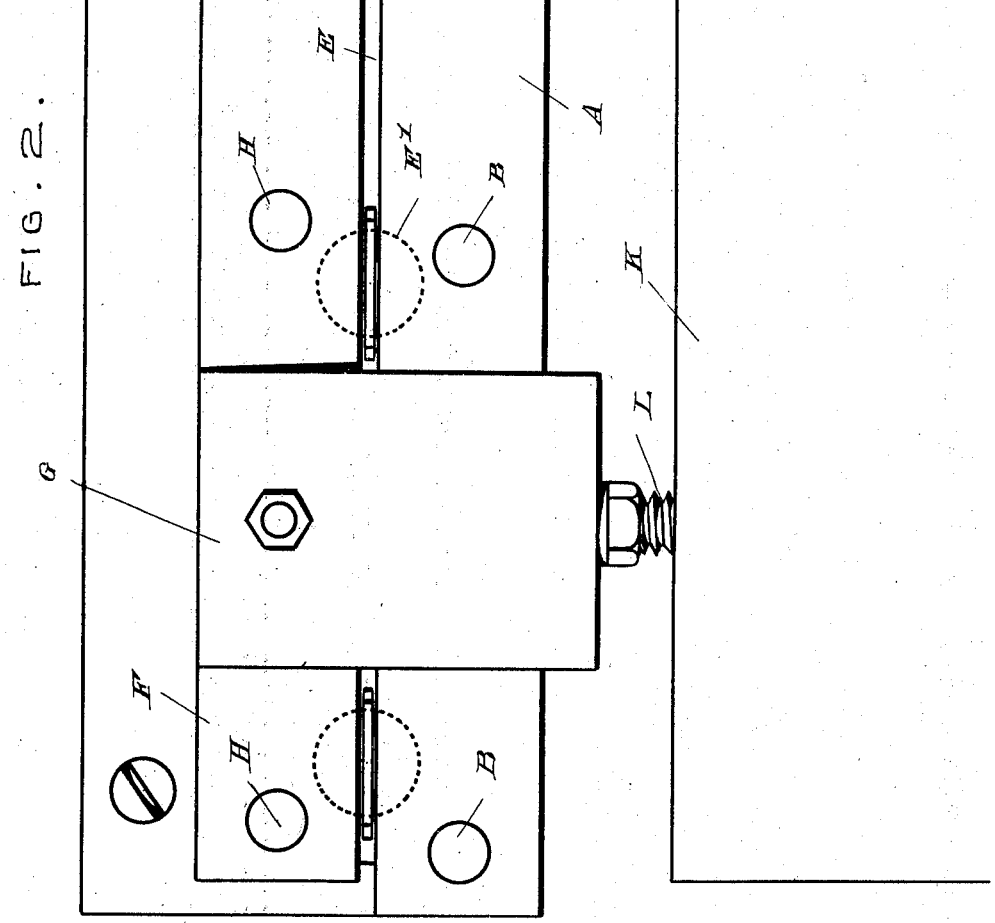
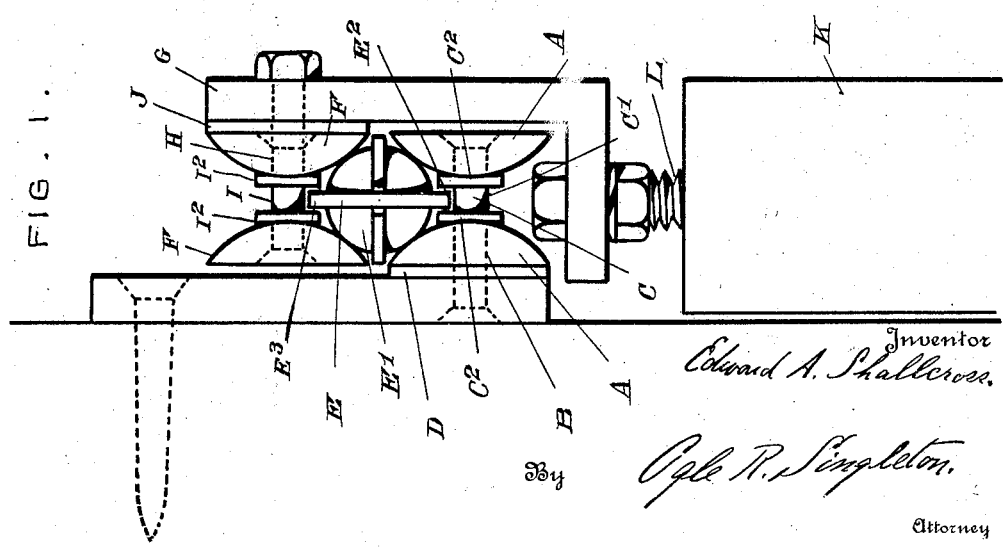

Patented Mar. 17, 1925.

1,530,141

UNITED STATES PATENT OFFICE.

EDWARD A. SHALLCROSS, OF PHILADELPHIA, PENNSYLVANIA.

HANGER.

Application filed December 26, 1923. Serial No. 682,767.

*To all whom it may concern:*

Be it known that I, EDWARD A. SHALLCROSS, a citizen of the United States, residing at Philadelphia, in the county of Philadelphia, in the State of Pennsylvania, have invented certain new and useful Improvements in Hangers, of which the following is a specification.

My invention consists in a new and useful improvement in hangers, and is designed to provide a travelling hanger for sliding doors in which the door is sustained upon a series of ball bearings which travel between two tracks, one of which is stationary and the other movable and carrying the door. The particularly novel and useful feature of my device is the form of these tracks which are composed of twin rails, spaced apart by collars upon bolts which secure the rails, and having convex bearing surfaces in contact with the ball bearings. An especially valuable feature of my device is the use of standard steel rods to provide the rails for the tracks, thus obviating the necessity of any special treatment of the material to fabricate the tracks. It is also to be noted that the use of spaced rails and sustaining bolts located at intervals along the rails eliminates dust-collecting grooves and obviates the likelihood of obstructions becoming lodged upon the tracks. The provision of convex surfaced rails to receive thereon the ball bearings, by the use of the convex surfaced standard steel bars, provides a particularly advantageous form of track.

I have illustrated in the drawing filed herewith one specific embodiment of my invention, the details of construction of which are hereinafter fully described, but the invention is capable of a variety of forms of embodiment, and it is to be understood that I do not consider the invention limited to the specific embodiment herein described but refer for its scope to the claims appended hereto.

In the drawings:

Fig. 1 is an end elevation of my improved hanger.

Fig. 2 is a side elevation of a portion of the device.

A stationary track is provided by the horizontally disposed bars A, A which are suitably mounted on a fixed supporting medium, such as a door frame, by means of bolts B which are provided with spacing collars C which may be integral with the bolts B or received thereover. These collars C have a middle reduced portion $C^1$ and outer discs $C^2$ which serve to space apart the rods A, A supported by the bolts B. It will be understood that a series of bolts B with these collars C serves to support the rods A, A in suitable position. Washers D on the bolts B are provided to space the inner rod A from the surface of the supporting medium.

A floating retainer bar E carrying ball bearings $E^1$ is mounted for reciprocation upon the rods A, its lower edge $E^2$ being received between the discs $C^2$ upon the collars C. Carried upon the ball bearings $E^1$ are the rods F, F, which carry the angle plates G by means of bolts H which are provided with collars I similar to the collars C upon the bolts B and serving to space the rods F upon the bolts H. Washers J are interposed between the plates G and the rod F adjacent thereto. The parts are so related that the upper edge $E^3$ of the bar E is received between the discs $I^2$ of the collars I. The door K is suitably hung from the plates G by means of pendant bolts L.

The bars A, A and F, F which are used to provide the lower stationary track and the upper travelling track for the ball bearings $E^1$ are standard steel bars having plane surfaces and convex surfaces. To provide these tracks for my improved device no specific treatment of these standard bars is required. All that is required to build the track is to bolt these bars in position as above described so disposing them that in each pair their convex surfaces are opposed, the one to the other, the plane surfaces being outwardly disposed in vertical planes. This disposition of the elements of my device secures this novel and useful result, viz. that I have provided tracks having convex rails to receive ball bearings.

Having described my invention, what I claim is:

1. A hanger having a track having two convex surfaces, ball bearings carried on said surfaces, and a second track having two convex surfaces, slidable upon said ball bearings.

2. In a hanger, the combination of a track having rails with convex surfaces; ball bearings carried on said rails; and a second track having rails with convex surfaces and slidable on said ball bearings.

3. In a hanger, the combination of a pair of rails; bolts connecting said rails; collars on said bolts spacing said rails apart; ball bearings mounted on said rails; a second pair of rails slidable on said ball bearings; bolts connecting the rails of said second pair; and collars on said bolts spacing said rails apart.

4. In a hanger, the combination of a pair of rails; bolts connecting said rails; collars on said bolts spacing said rails apart; ball bearings mounted on said rails; a retainer bar receiving said ball bearings therein and having its lower edge extending into said collars; a second pair of rails slidable on said ball bearings; bolts connecting the rails of said second pair; and collars on said bolts spacing said rails apart, the upper edge of said retainer bar extending into said second mentioned collars.

In testimony whereof I affix my signature.

EDWARD A. SHALLCROSS.